United States Patent
Fujimoto

(10) Patent No.: US 7,982,961 B2
(45) Date of Patent: Jul. 19, 2011

(54) DRY-TYPE MICROSCOPE OBJECTIVE LENS

(75) Inventor: Yasushi Fujimoto, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/686,502

(22) Filed: Jan. 13, 2010

(65) Prior Publication Data

US 2010/0177404 A1 Jul. 15, 2010

(30) Foreign Application Priority Data

Jan. 14, 2009 (JP) ................................ 2009-005894
Dec. 1, 2009 (JP) ................................ 2009-273222

(51) Int. Cl.
*G02B 21/02* (2006.01)
(52) U.S. Cl. ........................................ 359/657; 359/661
(58) Field of Classification Search ........... 359/656–661
See application file for complete search history.

(56) References Cited

U.S. PATENT DOCUMENTS

| | | | |
|---|---|---|---|
| 5,920,432 A | 7/1999 | Suenaga et al. | |
| 6,501,603 B2 * | 12/2002 | Kasahara | 359/656 |
| 7,382,542 B2 | 6/2008 | Wartmann | |
| 2008/0180805 A1 | 7/2008 | Yonetani | |

FOREIGN PATENT DOCUMENTS

| | | |
|---|---|---|
| JP | 11-249024 A | 9/1999 |
| JP | 2005-189732 A | 7/2005 |
| JP | 2007-133071 A | 5/2007 |

* cited by examiner

*Primary Examiner* — Scott J Sugarman
(74) *Attorney, Agent, or Firm* — Holtz, Holtz, Goodman & Chick, PC

(57) ABSTRACT

The present invention offers a dry-type microscope objective lens which has a high NA in the range from low magnification to middle magnification and is lightweight and by which a high-resolution image can be obtained without taking a user time and trouble in observation.

A dry-type microscope objective lens according to the present invention comprises, in order from the object side, a first lens group, a second lens group, and a third lens group, the first lens group comprises a meniscus lens which is arranged on the most object side and which turns its concave surface to the object side and the first lens group has positive refracting power as a whole, the second lens group comprises plural cemented lens units and has positive refracting power as a whole, the third lens group comprises air contact surfaces which are concave surfaces adjoining each other and facing toward each other and the third lens group has negative refracting power as a whole, and the dry-type microscope objective lens satisfies the following conditions:

$6 \leq D/f \leq 8$ $5 \leq f$ $0.8 \leq NA < 1.0$ where D is a distance from an object surface to the last surface of the objective lens, f is a focal length of the objective lens, and NA is an object-side numerical aperture.

7 Claims, 7 Drawing Sheets

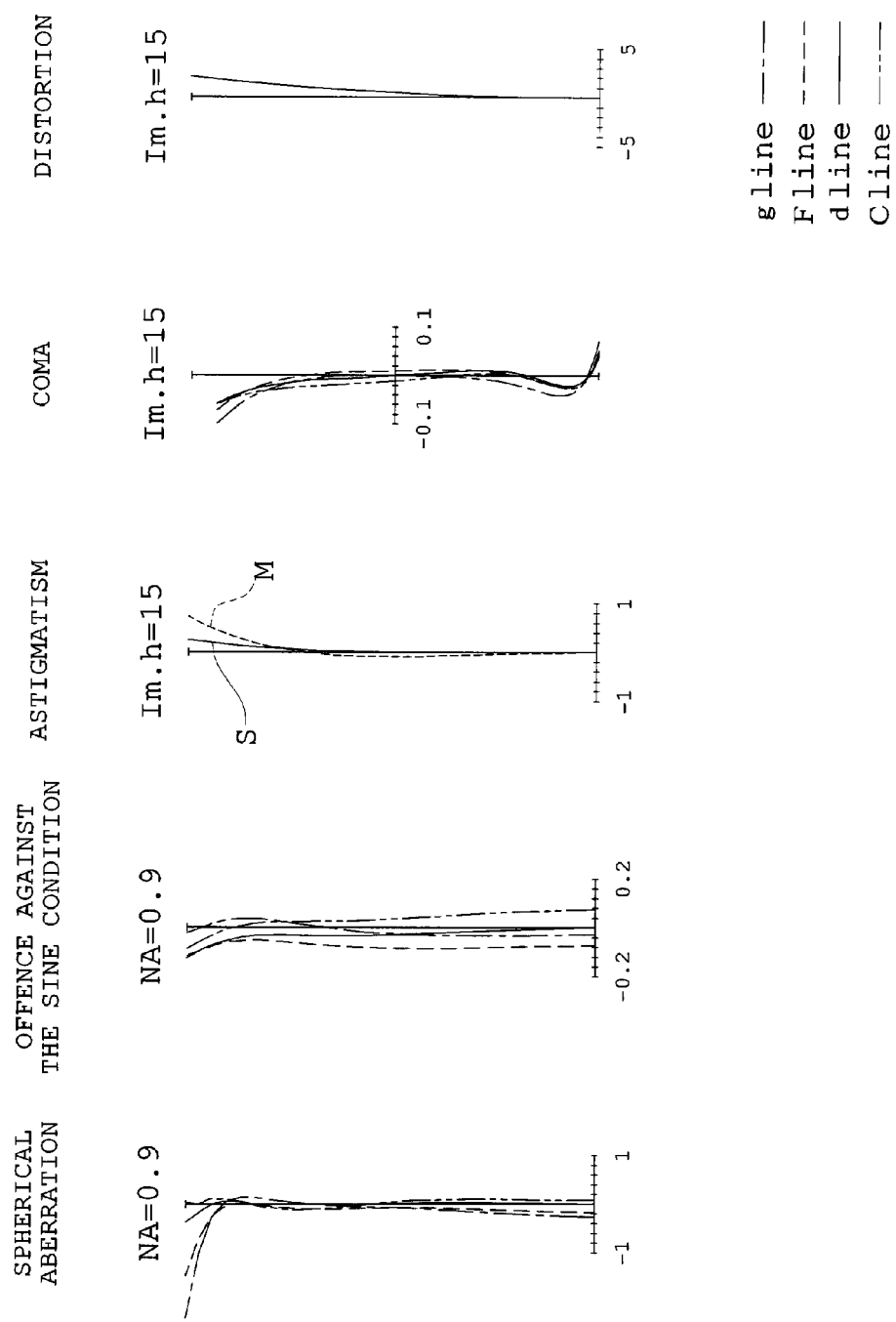

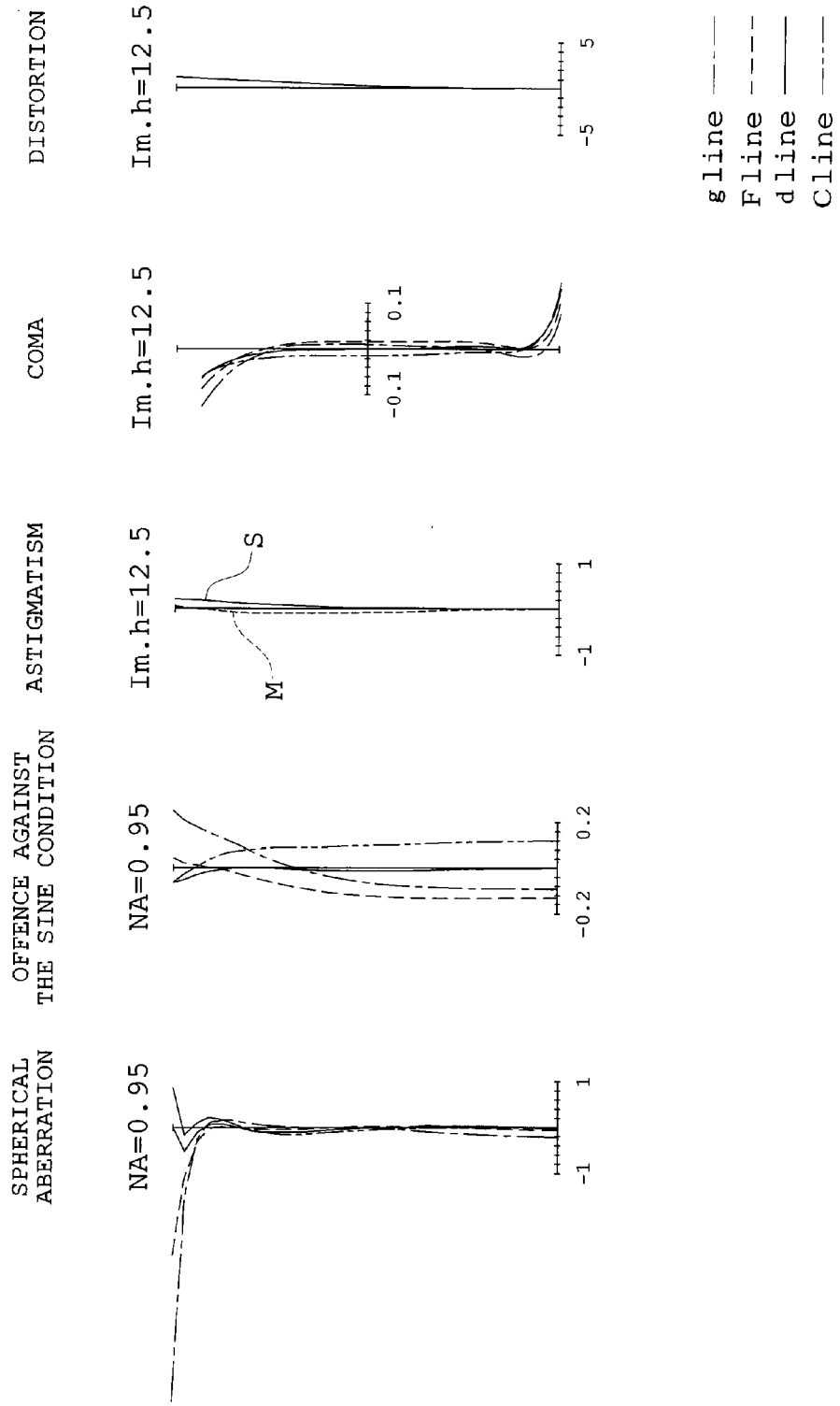

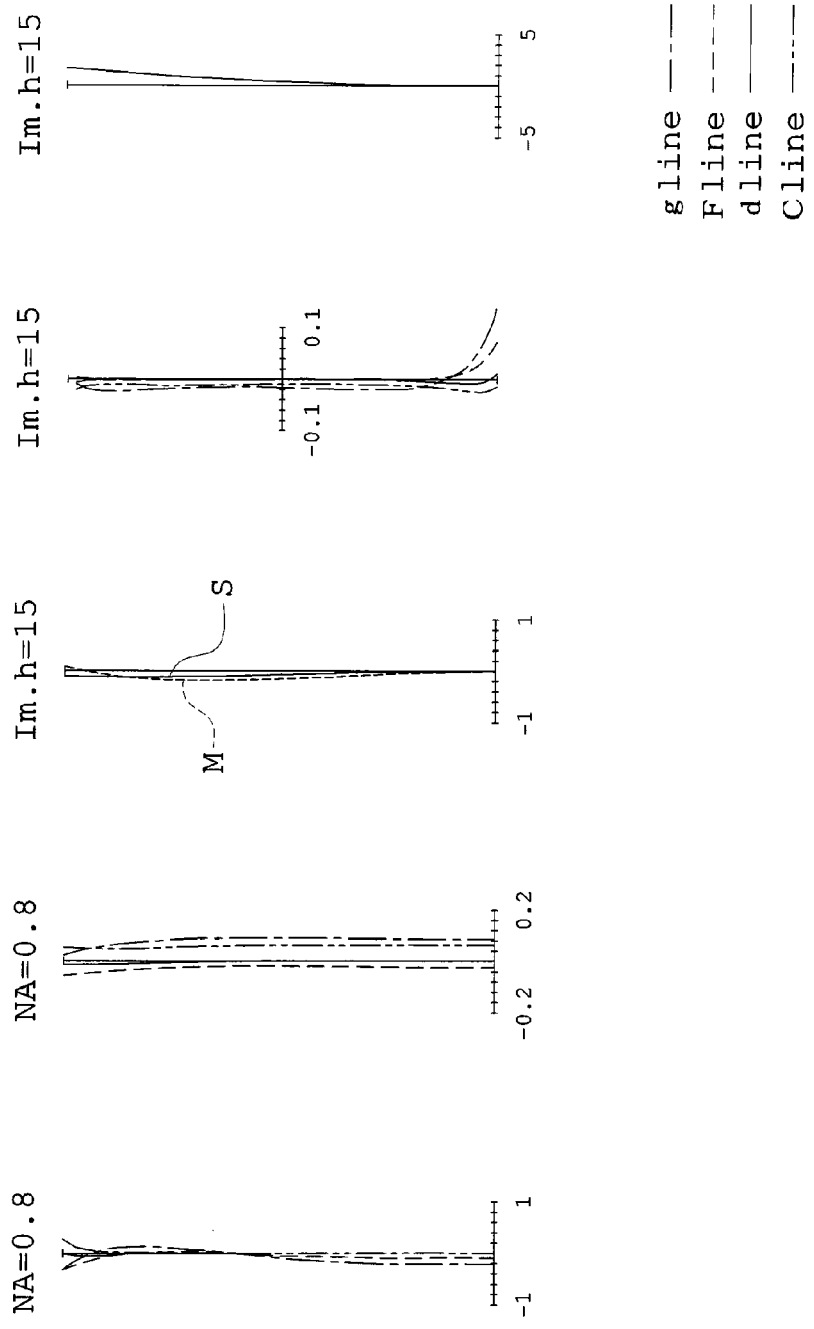

DRY-TYPE MICROSCOPE OBJECTIVE LENS

This application claims benefits of Japanese Patent Application No. 2009-5894 filed in Japan on Jan. 14, 2009 and No. 2009-273222 in Japan on Dec. 1, 2009, the contents of which are hereby incorporated by reference.

BACKGROUND OF THE INVENTION

1. Field of the Invention

This invention relates to a dry-type microscope objective lens. Especially, this invention relates to a dry-type microscope objective lens which has a high NA (numerical aperture) in the range from low magnification to middle magnification and is lightweight.

2. Description of the Related Art

A microscope is required to satisfy both capabilities for high speed scanning and for high resolution at the same time, for example, in the case of making a virtual slide. An optical system having a wide field of view on the object side is desired in order to achieve high speed scanning, and an optical system having a large object-side numerical aperture (NA) is desired in order to achieve high resolution.

Accordingly, a large number of objective lenses which are a lens of about 20 magnifications and have a high NA (numerical aperture) are used for observation with a microscope at present. For example, U.S. Pat. No. 6,501,603 B1, Japanese Patent Kokai No. 2005-189732, Japanese Patent Kokai No. 2007-133071, U.S. Pat. No. 7,382,542 B1, Japanese Patent Kokai No. Hei 11-249024, U.S. Pat. No. 5,920,432, and US 2008/0180805 disclose microscope objective lenses of about 20 magnifications which have a high NA.

U.S. Pat. No. 6,501,603 B1 discloses a dry objective lens of 20 magnifications which has an object-side NA of 0.8 and a water immersion objective lens of 20 magnifications which has an object-side NA of 0.9 to 0.95.

Japanese Patent Kokai No. 2005-189732 discloses a water immersion objective lens of 16 magnifications which has an object-side NA of 0.8.

Japanese Patent Kokai No. 2007-133071 discloses an oil immersion objective lens of 20 magnifications which has an object-side NA of 0.95.

U.S. Pat. No. 7,382,542 B1 discloses a water immersion objective lens of 20 magnifications which has an object-side NA of 1.0.

Japanese Patent Kokai No. Hei 11-249024 discloses a water immersion objective lens of 20 magnifications which has an object-side NA of 0.75.

U.S. Pat. No. 5,920,432 discloses a dry objective lens of 10 magnifications which has an object-side NA of 0.5 and a dry objective lens of 20 magnifications which has an object-side NA of 0.75.

US 2008/0180805 discloses a dry objective lens of 10 magnifications which has an object-side NA of 0.8.

SUMMARY OF THE INVENTION

A dry-type microscope objective lens according to the present invention is characterized in that: the dry-type microscope objective lens comprises, in order from the object side, a first lens group, a second lens group, and a third lens group; the first lens group comprises a meniscus lens which is arranged on the most object side and which turns its concave surface to the object side, and the first lens group has positive refracting power as a whole; the second lens group comprises plural cemented lens units and has positive refracting power as a whole; the third lens group comprises air contact surfaces which are concave surfaces adjoining each other and facing toward each other, and the third lens group has negative refracting power as a whole; and the dry-type microscope objective lens satisfies the following conditions (1), (2), and (3):

$$6 \leq D/f \leq 8 \quad (1)$$

$$5 \leq f \quad (2)$$

$$0.8 \leq NA < 1.0 \quad (3)$$

where D is a distance from an object surface to the last surface of the objective lens, f is a focal length of the objective lens, and NA is an object-side numerical aperture.

The dry-type microscope objective lens according to the present invention more preferably satisfies the following condition (2-1):

$$6.5 \leq f \quad (2\text{-}1)$$

The dry-type microscope objective lens according to the present invention preferably satisfies the following conditions (4) and (5):

$$4 \leq |f(Lm)/f| \leq 15 \quad (4)$$

$$0.3 \leq |Rm/f| \leq 1.0 \quad (5)$$

where f (Lm) is a focal length of the meniscus lens which is arranged on the most object side in the first lens group and which turns its concave surface to the object side, and Rm is an object-side radius of curvature of the meniscus lens.

The dry-type microscope objective lens according to the present invention preferably satisfies the following conditions (4-1) and (5):

$$4.5 |f(Lm)/f| \leq 10 \quad (4\text{-}1)$$

$$0.3 \leq |Rm/f| \leq 1.0 \quad (5)$$

where f (Lm) is a focal length of the meniscus lens which is arranged on the most object side in the first lens group and which turns its concave surface to the object side, and Rm is an object-side radius of curvature of the meniscus lens.

The dry-type microscope objective lens according to the present invention preferably satisfies the following conditions (4) and (5-1):

$$4 \leq |f(Lm)/f| \leq 15 \quad (4)$$

$$0.5 \leq |Rm/f| \leq 0.8 \quad (5\text{-}1)$$

where f (Lm) is a focal length of the meniscus lens which is arranged on the most object side in the first lens group and which turns its concave surface to the object side, and Rm is an object-side radius of curvature of the meniscus lens.

The dry-type microscope objective lens according to the present invention preferably satisfies the following condition (6):

$$0.7 \leq H3/H2 \leq 1.2 \quad (6)$$

where H2 is the height of a marginal ray which is incident on the third lens group, and H3 is the height of a marginal ray which emerges from the last surface of the objective lens.

The dry-type microscope objective lens according to the present invention preferably satisfies the following condition (6-1):

$$0.8 \leq H3/H2 \leq 1.1 \quad (6\text{-}1)$$

where H2 is the height of a marginal ray which is incident on the third lens group, and H3 is the height of a marginal ray which emerges from the last surface of the objective lens.

The dry-type microscope objective lens according to the present invention preferably satisfies the following condition (7):

$$-9 \leq f(G3)/f \qquad (7)$$

where f (G3) is a focal length of the third lens group, and f is a focal length of the objective lens.

The present invention offers a dry-type microscope objective lens which has a high NA in the range from low magnification to middle magnification and by which a high-resolution image can be obtained without taking a user time and trouble in observation.

These and other features and advantages of the present invention will become apparent from the following detailed description of the preferred embodiments when taken in conjunction with the accompanying drawings.

BRIEF DESCRIPTION OF THE DRAWINGS

FIGS. 5A, 5B, 5C, 5D, and 5E are diagrams showing aberration characteristics of an observation optical system which is formed by combining the objective lens according to the first embodiment and the tube lens shown in FIG. 4, and FIGS. 5A, 5B, 5C, 5D, and 5E show spherical aberration, offence against the sine condition, astigmatism, coma, and distortion respectively.

FIGS. 6A, 6B, 6C, 6D, and 6E are diagrams showing aberration characteristics of an observation optical system which is formed by combining the objective lens according to the second embodiment and the tube lens shown in FIG. 4, and FIGS. 6A, 6B, 6C, 6D, and 6E show spherical aberration, offence against the sine condition, astigmatism, coma, and distortion respectively.

FIGS. 7A, 7B, 7C, 7D, and 7E are diagrams showing aberration characteristics of an observation optical system which is formed by combining the objective lens according to the third embodiment and the tube lens shown in FIG. 4, and FIGS. 7A, 7B, 7C, 7D, and 7E show spherical aberration, offence against the sine condition, astigmatism, coma, and distortion respectively.

DETAILED DESCRIPTION OF THE PREFERRED EMBODIMENTS

Figure 1:
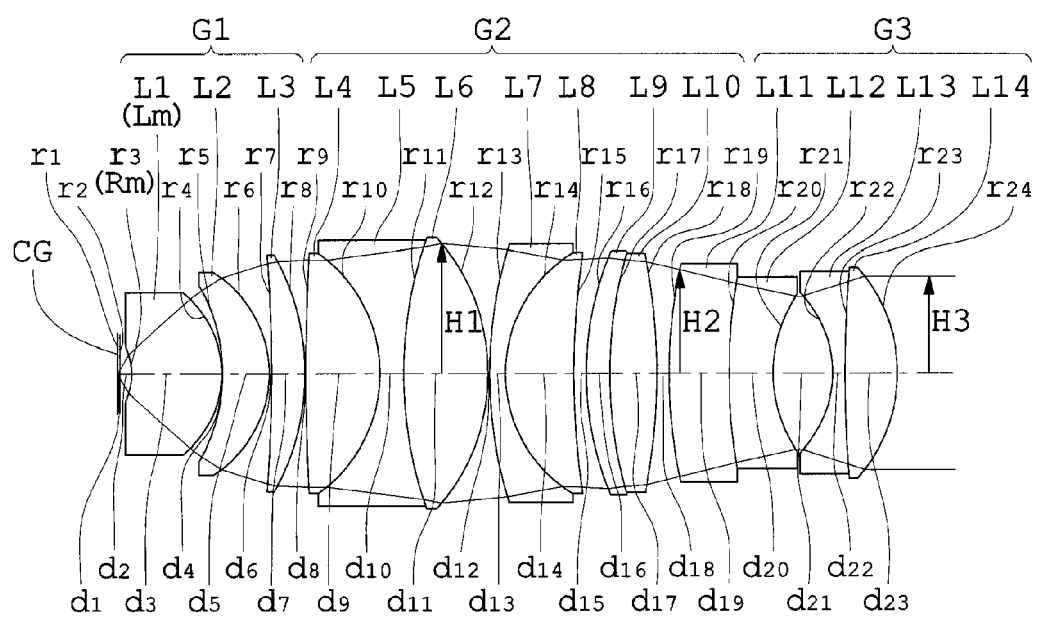
FIG. 1 is a sectional view showing the formation of a dry-type microscope objective lens according to the first embodiment of the present invention, taken along the optical axis.

Before undertaking the description of the embodiments of a dry-type microscope objective lens according to the present invention, the operation effects of the present invention will be explained in detail.

A dry-type microscope objective lens according to the present invention comprises in order from the object side: a first lens group which comprises a meniscus lens arranged on the most object side and turning its concave surface to the object side and which has positive refracting power as a whole; a second lens group which comprises plural cemented lens units and has positive refracting power as a whole; and a third lens group which comprises air contact surfaces which are concave surfaces adjoining each other and facing toward each other, and which has negative refracting power as a whole, and the dry-type microscope objective lens satisfies the following conditions (1), (2), and (3):

$$6 \leq D/f \leq 8 \qquad (1)$$

$$5 \leq f \qquad (2)$$

$$0.8 \leq NA < 1.0 \qquad (3)$$

where D is a distance from an object surface to the last surface of the objective lens, f is a focal length of the objective lens, and NA is an object-side numerical aperture.

Such design makes the first lens group have positive refracting power as a whole, and the first lens group makes light rays from an object converge. In addition, the meniscus lens which is arranged on the most object side and turns its concave surface to the object side corrects a field curvature.

The second lens group has positive refracting power as a whole and makes light rays converge gradually. In addition, the second lens group corrects each aberration well by the plural cemented lenses and corrects an axial chromatic aberration well. The second lens group preferably comprises at least one cemented lens consisting of three lenses in order to correct an axial chromatic aberration better.

The third lens group has negative refracting power as a whole and transforms light flux into parallel light flux. In addition, the third lens group can correct each aberration well by negative refracting power of the concave surfaces which adjoin each other and face toward each other. If there is only one concave surface in the third lens group, then it is difficult to correct each aberration well. Especially, correction of field curvature and coma becomes insufficient in this case, and it is impossible to obtain a flat field of view, or a wide field of view on the object side.

The conditions (1), (2), and (3) are used for the purposes of making a magnification small in order to obtain a wide field of view on the object side and of obtaining a large object-side NA.

If D/f is below the lower limit value of the condition (1), it is difficult to make a large object-side NA while the design of D/f below the lower limit of the condition (1) is advantageous to making a magnification low, and especially, it is difficult to correct a spherical aberration. On the other hand, if D/f is beyond the upper limit value of the condition (1), a magnification becomes too high while the design of D/f beyond the upper limit of the condition (1) is advantageous to making an object-side NA large, and it is difficult to obtain a wide field of view on the object side. In addition, the total length becomes too long relatively to the focal length in this case, so that the weight of the lens and the weight of a metal frame holding the lens increase.

If f is below the lower limit value of the condition (2), a magnification becomes too high, and it is difficult to obtain a wide field of view on the object side.

If NA is below the lower limit value of the condition (3), an object-side NA becomes too small, and it is impossible to obtain a necessary resolution. On the other hand, NA cannot be beyond the upper limit value of the condition (3), 1.0, because the present invention relates to a dry objective lens and the refractive index of air which is a substance between the objective lens and a specimen is 1.0.

The dry-type microscope objective lens according to the present invention preferably satisfies the following conditions (4) and (5):

$$4 \leq |f(Lm)/f| \leq 15 \quad (4)$$

$$0.3 \leq |Rm/f| \leq 1.0 \quad (5)$$

where f (Lm) is a focal length of the meniscus lens which is arranged on the most object side in the first lens group and which turns its concave surface to the object side, and Rm is an object-side radius of curvature of the meniscus lens.

The above-described condition (4) prescribes power of the meniscus lens (Lm) which is arranged on the most object side in the first lens group and which turns its concave surface to the object side. If |f (Lm)/f| is below the lower limit value of the condition (4), power of the meniscus lens (Lm) becomes too strong, and an amount of a spherical aberration occurring in the meniscus lens (Lm) becomes too large. In addition, the heights of light rays are lower in a lens unit on the exit side than in the meniscus lens (Lm), and this is disadvantageous to a correction of a field curvature. Accordingly, it is impossible to obtain a flat field of view, or a wide field of view on the object side. On the other hand, if |f (Lm)/f| is beyond the upper limit value of the condition (4), power of the meniscus lens (Lm) becomes too weak, and it is impossible to sufficiently bend light rays from a specimen. That is to say, it is impossible to take in light rays having a large object-side NA.

The above-described condition (5) prescribes power of the object-side concave surface of the meniscus lens (Lm) which is arranged on the most object side in the first lens group and which turns its concave surface to the object side. If |Rm/f| is below the lower limit value of the condition (5), the curvature of Rm becomes tight, and it is difficult to obtain a practical working distance. On the other hand, if |Rm/f| is beyond the upper limit value of the condition (5), such design is disadvantageous to a correction of a field curvature, and it is impossible to obtain a flat field of view, or a wide field of view on the object side.

It is more desirable for the dry-type microscope objective lens according to the present invention to satisfy the following conditions (4-1) and (5-1):

$$4.5 \leq |f(Lm)/f| \leq 10 \quad (4-1)$$

$$0.5 \leq |Rm/f| \leq 0.8 \quad (5-1)$$

where f (Lm) is a focal length of the meniscus lens which is arranged on the most object side in the first lens group and which turns its concave surface to the object side, and Rm is an object-side radius of curvature of the meniscus lens.

The dry-type microscope objective lens according to the present invention preferably satisfies the following condition (6):

$$0.7 \leq H3/H2 \leq 1.2 \quad (6)$$

where H2 is the height of a marginal ray which is incident on the third lens group, and H3 is the height of a marginal ray which emerges from the last surface of the objective lens.

The above-described condition (6) prescribes the ratio of the height of a marginal ray which emerges from the third lens group to the height of a marginal ray which is incident on the third lens group. If H3/H2 is below the lower limit value of the condition (6), positive refracting power of a total of the first lens group and second lens group becomes weak, and the heights of light rays becomes too high in the second lens group. As a result, it is difficult to correct an axial spherical aberration. On the other hand, if H3/H2 is beyond the upper limit value of the condition (6), positive refracting power of a total of the first lens group and second lens group becomes too strong. As a result, an exit-side pupil position of the objective lens becomes close to the object side, so that a pupil aberration of the objective lens deteriorates. The deterioration of the pupil aberration may unfavorably affect eclipse of light rays and coloration of green in a field of view in the case of combining the objective lens with a relay optical system to relay an image. Because frequent relays of images are made in a system microscope for making a virtual slide and other various microscopes, it is desirable that the pupil aberration is good. In addition, if an exit-side pupil position of the objective lens is too close to the object side, this may unfavorably have a bad influence also upon a differential-interference observation and a phase-contrast observation.

It is more desirable for the dry-type microscope objective lens according to the present invention to satisfy the following condition (6-1):

$$0.8 \leq H3/H2 \leq 1.1 \quad (6-1)$$

where H2 is the height of a marginal ray which is incident on the third lens group, and H3 is the height of a marginal ray which emerges from the last surface of the objective lens.

The dry-type microscope objective lens according to the present invention preferably satisfies the following condition (7):

$$-9 \leq f(G3)/f \quad (7)$$

where f (G3) is a focal length of the third lens group, and f is a focal length of the objective lens.

The above-described condition (7) prescribes power of the third lens group. If f (G3)/f is below the lower limit value of the condition (7), power of the third lens group becomes too weak, and it is difficult to make a magnification low. As a result, it is difficult to obtain a wide field of view.

It is more desirable for the dry-type microscope objective lens according to the present invention to satisfy the following condition (7-1):

$$-9 \leq f(G3)/f \leq -4 \quad (7-1)$$

The embodiments according to the present invention will be explained below using the diagrams.

First Embodiment

FIG. 1 is a sectional view showing the formation of a dry-type microscope objective lens according to the first embodiment of the present invention, taken along the optical axis.

The objective lens according to the first embodiment comprises, in order from the object side, a first lens group G1, a second lens group G2, and a third lens group G3.

The first lens group G1 comprises in order from the object side: a first lens L1 which has a positive meniscus shape and turns its concave surface to the object side; a second lens L2 which has a positive meniscus shape and turns its concave surface to the object side; and a third lens L3 which has a positive meniscus shape and turns its concave surface to the object side. The first lens group G1 has positive refracting power as a whole. The first lens L1 corresponds to a meniscus lens Lm which is arranged on the most object side in the first lens group G1 in the present invention and which turns its concave surface to the object side.

The second lens group G2 comprises in order from the object side: a cemented lens which is made by joining a biconvex-shaped fourth lens L4, a biconcave-shaped fifth lens L5, and a biconvex-shaped sixth lens L6; a cemented lens which is made by joining a negative meniscus-shaped seventh lens L7 and a positive meniscus-shaped eighth lens L8, where the seventh lens L7 turns its convex surface to the object side and the eighth lens L8 turns its convex surface to the object side; and a cemented lens which is made by joining a positive meniscus-shaped ninth lens L9 and a biconvex-shaped tenth lens L10, where the ninth lens L9 turns its convex surface to the object side. The second lens group G2 has positive refracting power as a whole.

The third lens group G3 comprises in order from the object side: a cemented lens which is made by joining a positive meniscus-shaped eleventh lens L11 and a negative meniscus-shaped twelfth lens L12, where the eleventh lens L11 turns its convex surface to the object side and the twelfth lens L12 turns its convex surface to the object side; and a cemented lens which is made by joining a biconcave-shaped thirteenth lens L13 and a biconvex-shaped fourteenth lens L14. The third lens group G3 has negative refracting power as a whole. The exit-side surface of the twelfth lens L12 and the object-side surface of the thirteenth lens L13 are air contact surfaces which are concave surfaces facing toward each other. CG shown in FIG. 1 is a cover glass.

Next, the numerical value data of the optical elements making up the objective lens of the first embodiment are shown.

In the numerical value data for the optical elements in each of the following embodiments, r denotes the radius of curvature of each lens surface, d denotes spacing between lens surfaces, nd denotes the refractive index of each lens at the d line, and vd denotes the Abbe's number of each lens to the d line. NA denotes an object-side numerical aperture, D denotes a distance from an object surface to the last surface of the objective lens (the unit: millimeter (mm)), f is a focal length of the objective lens (the unit: millimeter (mm)), f (Lm) is a focal length of the meniscus lens which is arranged on the most object side in the first lens group and which turns its concave surface to the object side (the unit: millimeter (mm)), Rm denotes the object-side radius of curvature of the meniscus lens which is arranged on the most object side in the first lens group and which turns its concave surface to the object side (the unit: millimeter (mm)), H1 denotes the height of a marginal ray which has the highest ray height in the first and second lens groups (the unit: millimeter (mm)), H2 denotes the height of a marginal ray which is incident on the third lens group (the unit: millimeter (mm)), H3 denotes the height of a marginal ray which emerges from the last surface of the objective lens (the unit: millimeter (mm)), and f (G1), f (G2), and f (G3) denote focal lengths of the first lens group, the second lens group, and the third lens group respectively (the unit: millimeter (mm)). These are common to the numerical value data of every embodiment which is described below.

Numerical value data 1 (the first embodiment)

Magnification: 20×
NA = 0.9
Field Number: 30
D = 65.676
f = 8.99
f (Lm) = 79.22
Rm = −5.4934
H1 = 10.81
H2 = 8.60
H3 = 8.08
f (G1) = 10.47
f (G2) = 29.50
f (G3) = −36.03

<Parameters satisfying the conditions>

Condition (1) D/f = 7.3
Condition (2) f = 8.99
Condition (3) NA = 0.9
Condition (4) | f (Lm)/f | = 8.81
Condition (5) | Rm/f | = 0.61
Condition (6) H3/H2 = 0.94
Condition (7) f (G3)/f = −4.0

| S | r | d | nd | vd |
|---|---|---|---|---|
| Object surface | ∞ | 0.1700 | 1.52100 | 56.02 (cover glass) |
| 2 | ∞ | 1.0275 | | |
| 3 | −5.4934 | 7.6651 | 1.88300 | 40.76 |
| 4 | −8.4262 | 0.0447 | | |
| 5 | −14.8500 | 4.0131 | 1.56907 | 71.30 |
| 6 | −9.7426 | 0.1000 | | |
| 7 | −133.0183 | 2.8626 | 1.56907 | 71.30 |
| 8 | −19.4119 | 0.1000 | | |
| 9 | 357.0144 | 6.1700 | 1.49700 | 81.54 |
| 10 | −12.2819 | 2.0000 | 1.63775 | 42.41 |
| 11 | 35.3625 | 7.1229 | 1.43875 | 94.93 |
| 12 | −16.7512 | 0.1000 | | |
| 13 | 38.3576 | 1.2435 | 1.63775 | 42.41 |
| 14 | 11.7900 | 5.7901 | 1.43875 | 94.93 |
| 15 | 69.0762 | 1.0000 | | |
| 16 | 26.1185 | 2.0000 | 1.63775 | 42.41 |
| 17 | 34.8260 | 4.0205 | 1.43875 | 94.93 |
| 18 | −45.9999 | 1.0000 | | |
| 19 | 43.4784 | 5.0710 | 1.43875 | 94.93 |
| 20 | 48.1030 | 3.6893 | 1.67300 | 38.15 |
| 21 | 11.8879 | 5.0000 | | |
| 22 | −9.5671 | 1.0000 | 1.61800 | 63.33 |
| 23 | 101.1055 | 4.4853 | 1.72342 | 37.95 |
| 24 | −13.0968 | | | |

Second Embodiment

Figure 2:
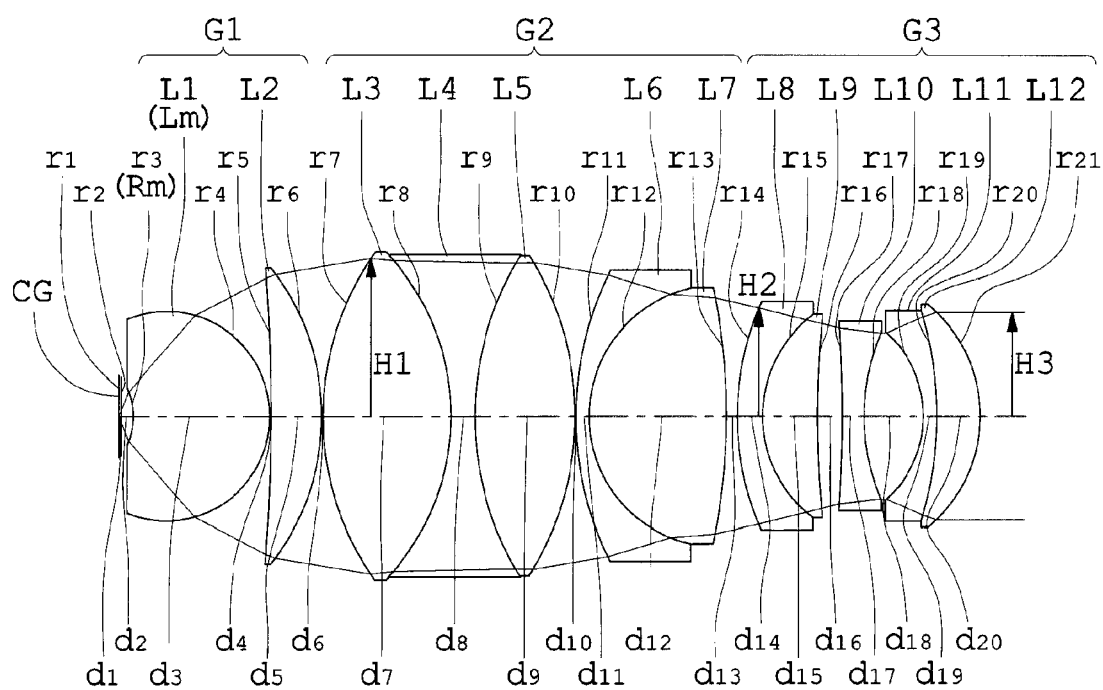
FIG. 2 is a sectional view showing the formation of a dry-type microscope objective lens according to the second embodiment of the present invention, taken along the optical axis.

FIG. 2 is a sectional view showing the formation of a dry-type microscope objective lens according to the second embodiment of the present invention, taken along the optical axis.

The objective lens according to the second embodiment comprises, in order from the object side, a first lens group G1, a second lens group G2, and a third lens group G3.

The first lens group G1 comprises in order from the object side: a first lens L1 which has a positive meniscus shape and turns its concave surface to the object side; and a second lens L2 which has a positive meniscus shape and which turns its concave surface to the object side. The first lens group G1 has positive refracting power as a whole. The first lens L1 corresponds to a meniscus lens Lm which is arranged on the most object side in the first lens group G1 in the present invention and turns its concave surface to the object side.

The second lens group G2 comprises in order from the object side: a cemented lens which is made by joining a biconvex-shaped third lens L3, a biconcave-shaped fourth lens L4, and a biconvex-shaped fifth lens L5; and a cemented lens which is made by joining a negative meniscus-shaped sixth lens L6 and a biconvex-shaped seventh lens L7, where the sixth lens L6 turns its convex surface to the object side. The second lens group G2 has positive refracting power as a whole.

The third lens group G3 comprises in order from the object side: a cemented lens which is made by joining a negative meniscus-shaped eighth lens L8 and a positive meniscus-shaped ninth lens L9, where the eighth lens L8 turns its convex surface to the object side and the ninth lens L9 turns its convex surface to the object side; and a cemented lens which is made by joining a biconcave-shaped tenth lens L10, a negative meniscus-shaped eleventh lens L11, and a positive meniscus-shaped twelfth lens L12, where the eleventh lens L11 turns its concave surface to the object side and the twelfth lens L12 turns its concave surface to the object side. The third lens group G3 has negative refracting power as a whole. The exit-side surface of the tenth lens L10 and the object-side surface of the eleventh lens L11 are air contact surfaces which are concave surfaces facing toward each other. CG shown in FIG. 2 is a cover glass.

Next, the numerical value data of the optical elements making up the objective lens of the second embodiment are shown.

Numerical value data 2 (the second embodiment)

Magnification: 20×
NA = 0.95
Field number: 25
D = 70.83
f = 8.99
f (Lm) = 47.55
Rm = −5.4333
H1 = 13.0
H2 = 8.93
H3 = 8.54
f (G1) = 15.63
f (G2) = 32.04
f (G3) = −44.50

<Parameters satisfying the conditions>

Condition (1) D/f = 7.88
Condition (2) f = 8.99
Condition (3) NA = 0.95
Condition (4) | f (Lm)/f | = 5.29
Condition (5) | Rm/f | = 0.60
Condition (6) H3/H2 = 0.96
Condition (7) f (G3)/f = −4.95

| S | r | d | nd | vd |
|---|---|---|----|----|
| Object surface | ∞ | 0.1700 | 1.52100 | 56.02 (cover glass) |
| 2 | ∞ | 1.0010 | | |
| 3 | −5.4333 | 11.3905 | 1.67790 | 55.34 |
| 4 | −8.5877 | 0.1000 | | |
| 5 | −104.8848 | 4.1424 | 1.56907 | 71.30 |
| 6 | −19.5161 | 0.1000 | | |
| 7 | 23.7560 | 10.4025 | 1.49700 | 81.54 |
| 8 | −19.6992 | 2.0000 | 1.63775 | 42.41 |
| 9 | 25.2233 | 8.2035 | 1.43875 | 94.93 |
| 10 | −24.9665 | 0.1266 | | |
| 11 | 27.7141 | 1.0715 | 1.63775 | 42.41 |
| 12 | 10.8195 | 11.2828 | 1.43875 | 94.93 |
| 13 | −48.7196 | 1.0000 | | |
| 14 | 24.4445 | 2.0000 | 1.63775 | 42.41 |
| 15 | 10.5534 | 4.5611 | 1.43875 | 94.93 |
| 16 | 121.7083 | 2.0000 | | |
| 17 | −72.4490 | 1.6702 | 1.51633 | 64.14 |
| 18 | 17.2984 | 5.0000 | | |
| 19 | −9.0745 | 1.0053 | 1.61800 | 63.33 |
| 20 | −30.8886 | 3.6028 | 1.73800 | 32.26 |
| 21 | −11.7872 | | | |

Third Embodiment

Figure 3:
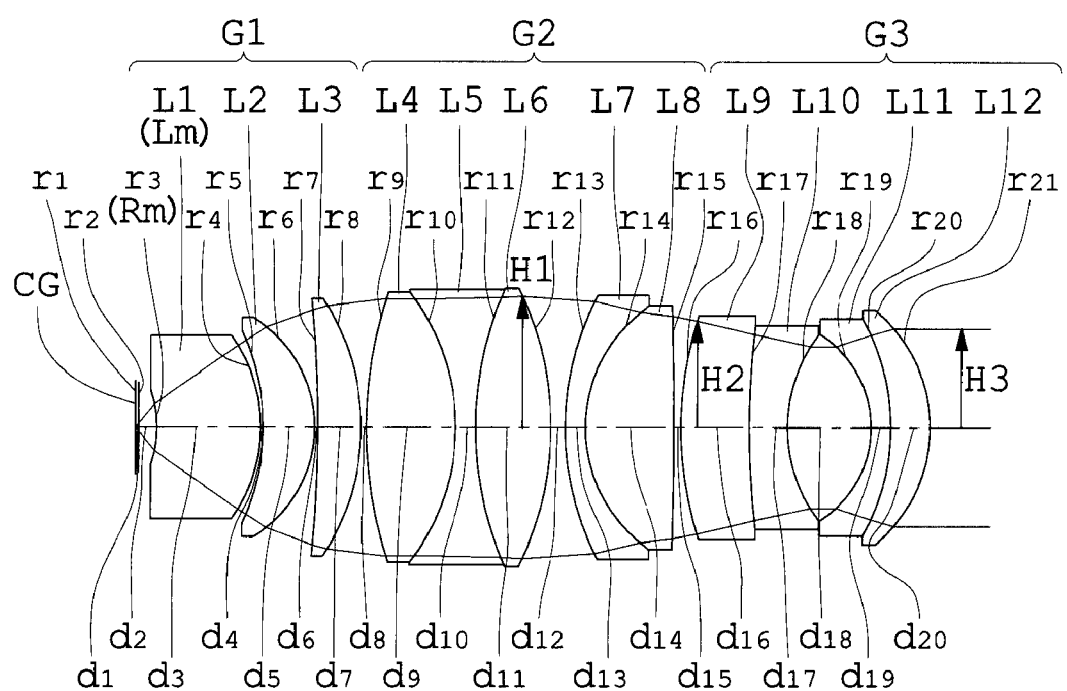
FIG. 3 is a sectional view showing the formation of a dry-type microscope objective lens according to the third embodiment of the present invention, taken along the optical axis.

FIG. 3 is a sectional view showing the formation of a dry-type microscope objective lens according to the third embodiment of the present invention, taken along the optical axis.

The objective lens according to the third embodiment comprises, in order from the object side, a first lens group G1, a second lens group G2, and a third lens group G3.

The first lens group G1 comprises in order from the object side: a first lens L1 which has a negative meniscus shape and turns its concave surface to the object side; a second lens L2 which has a positive meniscus shape and turns its concave surface to the object side; and a third lens L3 which has a positive meniscus shape and turns its concave surface to the object side. The first lens group G1 has positive refracting power as a whole. The first lens L1 corresponds to a meniscus lens Lm which is arranged on the most object side in the first lens group G1 in the present invention and which turns its concave surface to the object side.

The second lens group G2 comprises in order from the object side: a cemented lens which is made by joining a biconvex-shaped fourth lens L4, a biconcave-shaped fifth lens L5, and a biconvex-shaped sixth lens L6; and a cemented lens which is made by joining a negative meniscus-shaped seventh lens L7 and a biconvex-shaped eighth lens L8, where the seventh lens L7 turns its convex surface to the object side. The second lens group G2 has positive refracting power as a whole.

The third lens group G3 comprises in order from the object side: a cemented lens which is made by joining a positive meniscus-shaped ninth lens L9 and a negative meniscus-shaped tenth lens L10, where the ninth lens L9 turns its convex surface to the object side and the tenth lens L10 turns its convex surface to the object side; and a cemented lens which is made by joining a negative meniscus-shaped eleventh lens L11 and a positive meniscus-shaped twelfth lens L12, where the eleventh lens L11 turns its concave surface to the object side and the twelfth lens L12 turns its concave surface to the object side. The third lens group G3 has negative refracting power as a whole. The exit-side surface of the tenth lens L10 and the object-side surface of the eleventh lens L11 are air contact surfaces which are concave surfaces facing toward each other. CG shown in FIG. 3 is a cover glass.

Next, the numerical value data of the optical elements making up the objective lens of the third embodiment are shown.

Numerical value data 3 (the third embodiment)

Magnification: 20×
NA = 0.8
Field number: 30
D = 57.359
f = 9
f (Lm) = −50.984
Rm = −6.1356
H1 = 9.5
H2 = 7.67
H3 = 7.2
f (G1) = 13.686
f (G2) = 29.938
f (G3) = −43.141

<Parameters satisfying the conditions>

Condition (1) D/f = 6.37
Condition (2) f = 9
Condition (3) NA = 0.8
Condition (4) | f (Lm)/f | = 5.66
Condition (5) | Rm/f | = 0.68
Condition (6) H3/H2 = 0.94
Condition (7) f (G3)/f = −4.79

| S | r | d | nd | vd |
|---|---|---|----|----|
| Object surface | ∞ | 0.1700 | 1.52100 | 56.02 (cover glass) |
| 2 | ∞ | 1.4134 | | |
| 3 | −6.1356 | 7.4753 | 1.88300 | 40.76 |
| 4 | −11.1623 | 0.2000 | | |
| 5 | −15.9503 | 3.6699 | 1.56907 | 71.30 |
| 6 | −9.2588 | 0.3000 | | |
| 7 | −77.3158 | 3.1199 | 1.49700 | 81.54 |

-continued

| | | | | |
|---|---|---|---|---|
| 8 | −16.1325 | 0.3000 | | |
| 9 | 30.2237 | 6.4890 | 1.49700 | 81.54 |
| 10 | −15.6541 | 1.5000 | 1.63775 | 42.41 |
| 11 | 26.1015 | 5.4413 | 1.43875 | 94.93 |
| 12 | −21.5593 | 1.0000 | | |
| 13 | 21.3045 | 1.5000 | 1.63775 | 42.41 |
| 14 | 10.9370 | 6.3553 | 1.43875 | 94.93 |
| 15 | −133.8761 | 0.5000 | | |
| 16 | 26.1348 | 4.8881 | 1.49700 | 81.54 |
| 17 | 80.3661 | 2.6575 | 1.61340 | 44.27 |
| 18 | 10.9067 | 6.0834 | | |
| 19 | −8.0524 | 1.5001 | 1.48749 | 70.23 |
| 20 | −15.7407 | 2.7963 | 1.74000 | 28.30 |
| 21 | −11.0024 | | | |

An environmentally-friendly glass (lead-free glass) is chosen as an optical glass material which is used for each of the objective lenses of the first, second, and third embodiments, and the objective lens of each embodiment according to the present invention is in consideration for the environment.

The objective lenses of the first, second, and third embodiments are an objective lens of infinite design, so that the objective lenses cannot solely form an image. For example, the objective lenses are used in combination with an tube lens which is shown in the following fourth embodiment (and which has a focal length of 180 mm). In addition, it is desirable that the distance between the objective lens and the tube lens ranges from 0 mm to 150 mm.

Figure 4:
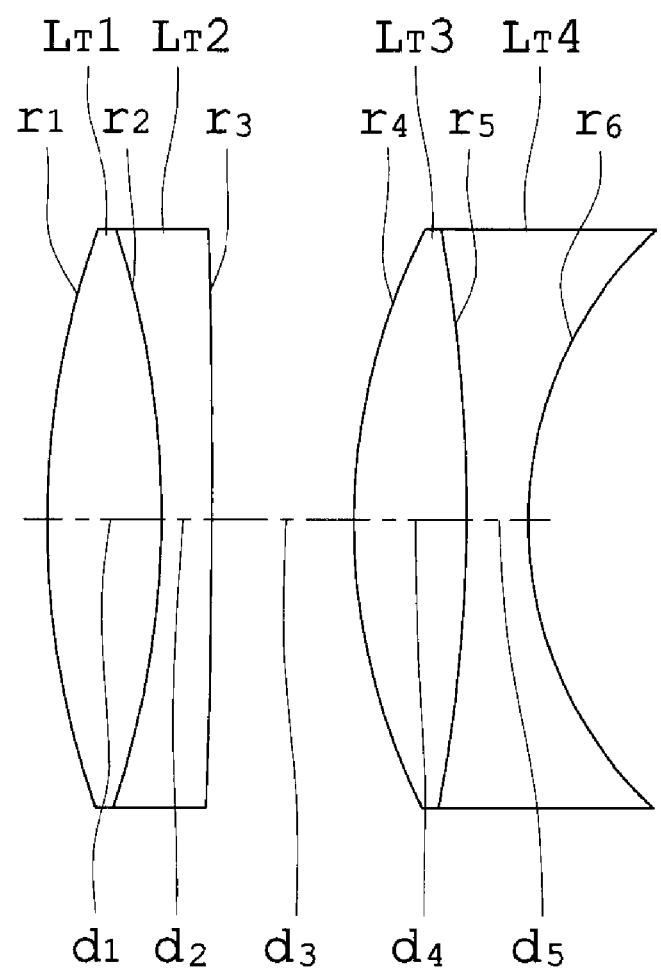
FIG. 4 is a sectional view showing one example of a formation of an tube lens which is favorable for using the tube lens in combination with an objective lens according to the to first, second, or third embodiment of the present invention, taken along the optical axis.

FIG. 4 is a sectional view showing a formation of an tube lens which is favorable for using the tube lens in combination with an objective lens unit according to the first, second, or third embodiment of the present invention, taken along the optical axis.

The tube lens comprises in order from the object side: a cemented lens which is made by joining a biconvex-shaped first lens $L_T1$ and a negative meniscus-shaped second lens $L_T2$, where the second lens $L_T2$ turns its concave surface to the object side; and a cemented lens which is made by joining a biconvex-shaped third lens $L_T3$ and a biconcave-shaped fourth lens $L_T4$.

Next, the numerical value data of the optical elements making up the tube lens are shown. In the following numerical value data, $f_{TL}$ is a focal length of the tube lens (the unit: millimeter (mm)).

Numerical value data 4

$f_{TL}$ = 180 mm

| S | r | d | nd | vd |
|---|---|---|---|---|
| 1 | 60.4357 | 8.5000 | 1.49700 | 81.54 |
| 2 | −67.2328 | 3.8000 | 1.72047 | 34.71 |
| 3 | −640.4760 | 10.2859 | | |
| 4 | 44.0586 | 8.5000 | 1.72342 | 37.95 |
| 5 | −113.8863 | 4.4000 | 1.61340 | 44.27 |
| 6 | 28.0371 | 129.5618 | | |
| Image surface | ∞ | | | |

Aberration diagrams of the observation optical system in the case of a distance of 90 mm between the objective lens of the first embodiment and the tube lens are shown in FIG. 5. Aberration diagrams of the observation optical system in the case of a distance of 90 mm between the objective lens of the second embodiment and the tube lens are shown in FIG. 6. Aberration diagrams of the observation optical system in the case of a distance of 90 mm between the objective lens of the third embodiment and the tube lens are shown in FIG. 7. In FIGS. 5, 6, and 7, FIGS. 5A, 6A, and 7A show spherical aberration, FIGS. 5B, 6B, and 7B show offence against the sine condition, FIGS. 5C, 6C, and 7C show astigmatism, FIGS. 5D, 6D, and 7D show coma, and FIGS. 5E, 6E, and 7E show distortion. The unit used in all the aberration diagrams is millimeter, and Im. h denotes an image height (the unit: millimeter (mm)).

It is clear from these aberration diagrams that each aberration of on-axis and off-axis aberrations is corrected well in the objective lenses according to the present invention and that the objective lenses according to the present invention make it possible to make a good observation in wide field of view while the objective lenses have a high NA.

Although the above explains the embodiments of a dry-type microscope objective lens according to the present invention, a constitution of a dry-type microscope objective lens according to the present invention is not limited to the constitutions of the above-described embodiments, and a dry-type microscope objective lens according to the present invention may have any constitution if the constitution is in the range of the objective lens satisfying the constituent features of the present invention.

A dry-type microscope objective lens according to the present invention is useful for the fields of biology, medical treatment, and medical science which require an observation using a lightweight objective lens which has a wide field of view on the objects side and has a large object-side NA, for example, like a pathological diagnosis using a virtual slide.

What is claimed is:

1. A dry-type microscope objective lens comprising, in order from an object side, a first lens group, a second lens group, and a third lens group;
   wherein the first lens group comprises a meniscus lens which is arranged on the most object side and which turns its concave surface to the object side and the first lens group has positive refracting power as a whole,
   wherein the second lens group comprises plural cemented lens units and has positive refracting power as a whole,
   wherein the third lens group comprises air contact surfaces which are concave surfaces adjoining each other and facing toward each other and the third lens group has negative refracting power as a whole, and
   wherein the dry-type microscope objective lens satisfies the following conditions:

$6 \leq D/f \leq 8$ $5 \leq f$ $0.8 \leq NA < 1.0$ $4 \leq |f(Lm)/f| \leq 15$ $0.3 \leq |Rm/f| \leq 1.0$ where D is a distance from an object surface to the last surface of the objective lens, f is a focal length of the objective lens, NA is an object-side numerical aperture, f(Lm) is a focal length of the meniscus lens which is arranged on the most object side in the first lens group and which turns its concave surface to the object side, and Rm is an object-side radius of curvature of the meniscus lens.

2. The dry-type microscope objective lens according to claim 1 satisfying the following condition:

$4.5 \leq |f(Lm)/f| \leq 10$.

3. The dry-type microscope objective lens according to claim 1 satisfying the following condition:

$$0.5 \leq |Rm/f| \leq 0.8.$$

4. The dry-type microscope objective lens according to claim 1 satisfying the following condition:

$$0.7 \leq H3/H2 \leq 1.2$$

where H2 is the height of a marginal ray which is incident on the third lens group, and H3 is the height of a marginal ray which emerges from the last surface of the objective lens.

5. The dry-type microscope objective lens according to claim 1 satisfying the following condition:

$$0.8 \leq H3/H2 \leq 1.1$$

where H2 is the height of a marginal ray which is incident on the third lens group, and H3 is the height of a marginal ray which emerges from the last surface of the objective lens.

6. The dry-type microscope objective lens according to claim 1 satisfying the following condition:

$$-9 \leq f(G3)/f$$

where f(G3) is a focal length of the third lens group, and f is a focal length of the objective lens.

7. The dry-type microscope objective lens according to claim 4 satisfying the following condition:

$$-9 \leq f(G3)/f$$

where f(G3) is a focal length of the third lens group, and f is a focal length of the objective lens.

* * * * *